US012597250B2

(12) United States Patent
Kogan et al.

(10) Patent No.: US 12,597,250 B2
(45) Date of Patent: Apr. 7, 2026

(54) DETECTION OF PLANT DETRIMENTS

(71) Applicant: Fermatagro Technology Limited, Limassol (CY)

(72) Inventors: Valeria Kogan, Tel Aviv (IL); Victor Asafov, Thames Ditton (GB); Artur Panchenko, Almaty (KZ); Maria Starostina, Ramat Gan (IL)

(73) Assignee: Fermatagro Technology Limited, Limassol (CY)

( * ) Notice: Subject to any disclaimer, the term of this patent is extended or adjusted under 35 U.S.C. 154(b) by 0 days.

(21) Appl. No.: 19/190,916

(22) Filed: Apr. 28, 2025

(65) Prior Publication Data

US 2025/0342595 A1 Nov. 6, 2025

(30) Foreign Application Priority Data

May 5, 2024 (IL) .......................................... 312614

(51) Int. Cl.
*G06V 20/10* (2022.01)
*G06T 7/00* (2017.01)
(Continued)

(52) U.S. Cl.
CPC .......... *G06V 20/188* (2022.01); *G06T 7/0016* (2013.01); *G06T 7/11* (2017.01);
(Continued)

(58) Field of Classification Search
CPC ...... A01C 21/007; A01G 9/24; A01M 7/0089; A01P 17/00; G06T 7/0016; G06T 19/006;
(Continued)

(56) References Cited

U.S. PATENT DOCUMENTS 11,140,813 B1 * 10/2021 Morrison ............... G06N 20/00
11,672,203 B2 * 6/2023 Vandike ............. G01C 21/3826
700/44

(Continued)

FOREIGN PATENT DOCUMENTS

EP 3804488 A1 4/2021
WO 2022164656 A1 8/2022

OTHER PUBLICATIONS

Ahmed et al. "Plant disease detection using machine learning approaches." Expert Systems 40.5 (2023): e13136. (Year: 2023).*

(Continued)

*Primary Examiner* — Katrina R Fujita
(74) *Attorney, Agent, or Firm* — Meitar Patents Ltd.; Daniel Kligler

(57) ABSTRACT

A computer-implemented method and system for detecting plant detriments includes receiving images of a plant area captured by at least one camera. For each received image, the method includes dividing the image into multiple image zones and processing the image by applying a sequence of machine learning plant detriment processing models to each zone. Plant detriment information in the plant area is determined based on the processing. The processing may include applying classifiers to detect plant detriment artifacts in image zones, utilizing information from previously processed zones. An alert may be issued or a report provided based on the determined plant detriment information. The system includes cameras for capturing plant area images and a processor configured to divide images into zones, apply machine learning models to the zones, and determine plant detriment information. The plant detriments may include pests or diseases.

20 Claims, 8 Drawing Sheets

207

(51) Int. Cl.
  *G06T 7/11* (2017.01)
  *G06T 7/70* (2017.01)
  *G06T 19/00* (2011.01)
(52) U.S. Cl.
  CPC .............. *G06T 7/70* (2017.01); *G06T 19/006*
  (2013.01); *G06T 2207/20081* (2013.01); *G06T*
  *2207/30188* (2013.01); *G06T 2207/30252*
  (2013.01)
(58) Field of Classification Search
  CPC . G06T 2207/20081; G06T 2207/30188; G06T
  2207/30252; G06V 10/62; G06V 10/764;
  G06V 10/82; G06V 20/188; G06V 20/56;
  G06V 20/68
  See application file for complete search history.

(56) References Cited

U.S. PATENT DOCUMENTS

| | | | | |
|---|---|---|---|---|
| 12,137,681 | B2 * | 11/2024 | Sibley ................. | A01M 7/0089 |
| 2008/0253618 | A1 * | 10/2008 | Hendrickson ......... | G06V 20/13 |
| | | | | 382/110 |
| 2019/0108631 | A1 * | 4/2019 | Riley ................... | G06T 7/0004 |
| 2019/0171909 | A1 * | 6/2019 | Mandal .................. | G06T 7/246 |
| 2019/0377946 | A1 | 12/2019 | Genty et al. | |
| 2021/0133443 | A1 | 5/2021 | Gurzoni, Jr. et al. | |
| 2021/0149406 | A1 | 5/2021 | Javault et al. | |
| 2022/0117215 | A1 * | 4/2022 | Sibley .................. | A01M 21/00 |
| 2022/0172056 | A1 | 6/2022 | Mineno et al. | |
| 2022/0245381 | A1 | 8/2022 | Takla et al. | |
| 2022/0270249 | A1 * | 8/2022 | Dadsetan ............... | G06V 10/25 |
| 2022/0375239 | A1 | 11/2022 | Agarwal et al. | |
| 2022/0400596 | A1 * | 12/2022 | Sibley ...................... | G06T 7/74 |
| 2023/0124667 | A1 | 4/2023 | Sibley et al. | |
| 2023/0225239 | A1 | 7/2023 | Guan et al. | |

OTHER PUBLICATIONS

International Application # PCT/IB2025/050967 Search Report dated May 27, 2025.

* cited by examiner

207

240

PLANT AREA MONITORING PROCESS

DETECTION OF PLANT DETRIMENTS

TECHNICAL FIELD

The present disclosure generally relates to the fields of plant monitoring, agricultural productivity, image processing, and machine learning.

BACKGROUND

Agricultural processes require continual and vigilant monitoring to facilitate the effective cultivation of crops and other plants. Major factors that can impair plant growth and development include the presence of pests and diseases. Examples include various insects, parasites, bacteria, and/or fungi, such as aphids, botrytis, and downy mildew, as well as general nutrient deficiencies. Different pests and diseases may be detrimental in different ways, and their detection and accurate identification can be crucial for preventing losses in yield and reduced product quantity. However, some plant pests and diseases are difficult to detect sufficiently early. The characteristics and severity of effects may rapidly change under different conditions. While certain pests or diseases may be visually observable on the plants, it may be difficult to monitor a large quantity of plants on a broad scale, particularly for a diversity of plant types/variants that may be distributed in multiple locations. Furthermore, some pests or diseases may be easily mistaken for other variants and may require expert analysis to manually discriminate and accurately identify.

In general, early detection and proper diagnosis of diseases and pests is crucial for ensuring proper plant development and mitigating problems that could exacerbate over time. Addressing such detriments after they have become well established may be too late for saving the crop and preventing permanent damage. It is further desirable for farmers or plant cultivators to avoid wasting time on false positive detections and to only treat plants that truly require treatment.

SUMMARY

In accordance with one aspect of the present disclosure, there is thus provided a computer-implemented method for detecting plant detriments. The method includes the step of receiving images of a plant area in a plant cultivation facility captured by at least one camera. The method includes the step of, for each of at least one received image, applying the processing steps of, dividing the received image into a plurality of image zones, and processing the received image by applying a sequence of machine learning plant detriment processing models to each of the image zones. The method includes the step of determining plant detriment information in the plant area, based on the processing. The processing step of applying a sequence of machine learning processing models may include the sub-procedures of: applying a first classifier, configured to detect a first plant detriment artifact, on a first image zone of the image; applying at least one second classifier, configured to detect a second plant detriment artifact, on a second image zone of the image; applying the first classifier on at least one second image zone of the image, utilizing information from at least one previously processed image zone; and applying the at least one second classifier on the at least one second image zone, utilizing information from at least one previously processed image zone. The information from at least one previously processed image zone may be differentially weighted based on at least one property of: a spatial proximity to the currently processed image zone; and/or a confidence level of the processing results of the previously processed image zone. The sub-procedures may be repeated over a plurality of iterations in the first image. The processing steps may be repeated for a plurality of received images. The method may further include the processing step of comparing the processing results of at least one image with at least one previous image. The method may further include the step of issuing an alert responsive to the plant detriment determination. The step of issuing an alert may be performed when a priority of a plant detriment exceeds a threshold. The method may further include the step of providing a report of the determined plant detriment information. The images may be acquired periodically over a predetermined interval. The plant area may be divided into a plurality of plant area regions, and a position and orientation of each of the plant area regions may be obtained. The position and orientation of each of the plant area regions may be obtained based on at least one of: measurements obtained from at least one sensor configured to measure the position and orientation of the camera with respect to a reference coordinate system; measurements obtained from an inertial measurement unit coupled with the camera, the inertial measurement unit configured to detect a viewing direction of the camera or position and orientation coordinates of a scene imaged by the camera; and/or installation parameters of the camera determined using computer vision based processes. The method may further include receiving a client verification of a determined plant detriment and updating at least one plant detriments processing model in accordance with a received verification. The method may further include the step of recommending at least one action for mitigating a determined plant detriment. The method may further include the step of displaying a panoramic image of the plant area with at least one augmented reality image comprising supplementary content relating to a determined plant detriment, the supplementary content overlaid conformally onto the panoramic image at the location of a respective plant of the determined plant detriment. The machine learning plant detriment processing models may be generated during a training stage, including the steps of: forming a training dataset comprising a plurality of reference images of a plant area, each reference image comprising at least one plant characterized with a known plant detriment; dividing each of the reference images into a plurality of image zones, and processing the reference images to determine image features with a respective plant detriment, and relationships between the images for differentiating between plant detriments; and applying at least one machine learning process to the training dataset to generate at least one processing model in accordance with the feature analysis. The method may further include the step of applying a spray treatment to a selected portion of the plant area based on the determined plant detriment information. The camera may be mounted on a vehicle, and images of the plant area may be captured by the camera as the vehicle is traveling along the plant area. The plant detriment may include one of: a plant pest; and a plant disease.

In accordance with another aspect of the present disclosure, there is thus provided a computer-implemented system for detecting plant detriments. The system includes at least one camera, configured for capturing images of a plant area in a plant cultivation facility. The system include a processor, configured to receive the captured images, and for each of at least one received image, to apply the processing steps of: dividing the received image into a plurality of image zones; and processing the receive image by applying a sequence of machine learning plant detriment processing models to each of the image zones, the processor configured to determine plant detriment information in the plant area, based on the processing. The processor may be configured to apply a sequence of machine learning processing models by performing the sub-procedures of: applying a first classifier, configured to detect a first plant detriment artifact, on a first image zone of the image; applying at least one second classifier, configured to detect a second plant detriment artifact, on a second image zone of the image; applying the first classifier on at least one second image zone of the image, utilizing information from at least one previously processed image zone; and applying the at least one second classifier on the at least one second image zone, utilizing information from at least one previously processed image zone. The information from at least one previously processed image zone may be differentially weighted based on at least one property of: a spatial proximity to the currently processed image zone; and/or a confidence level of the processing results of the previously processed image zone. The processor may be configured to repeat the sub-procedures over a plurality of iterations in the first image. The processor may be configured to repeat the processing steps for a plurality of received images. The processor may be further configured to apply the processing step of comparing the processing results of at least one image with at least one previous image. The processor may be further configured to issue an alert responsive to the plant detriment determination. The processor may be configured to issue the alert when a priority of a plant detriment exceeds a threshold. The processor may be further configured to provide a report of the determined plant detriment information. The images may be acquired periodically over a predetermined interval. The plant area may be divided into a plurality of plant area regions, and a position and orientation of each of the plant area regions may be obtained. The position and orientation of each of the plant area regions may be obtained based on at least one of: measurements obtained from at least one sensor configured to measure the position and orientation of the camera with respect to a reference coordinate system; measurements obtained from an inertial measurement unit coupled with the camera, the inertial measurement unit configured to detect a viewing direction of the camera or position and orientation coordinates of a scene imaged by the camera; and/or installation parameters of the camera determined using computer vision based processes. The processor may be further configured to receive a client verification of a determined plant detriment and to update at least one plant detriments processing model in accordance with a received verification. The processor may be further configured to provide a recommendation of at least one action for mitigating a determined plant detriment. The system may further include a display, configured to display a panoramic image of the plant area with at least one augmented reality image comprising supplementary content relating to a determined plant detriment, the supplementary content overlaid conformally onto the panoramic image at the location of a respective plant of the determined plant detriment. The machine learning plant detriment processing models may be generated during a training stage, including the steps of: forming a training dataset comprising a plurality of reference images of a plant area, each reference image comprising at least one plant characterized with a known plant detriment; dividing each of the reference images into a plurality of image zones, and processing the reference images to determine image features with a respective plant detriment, and relationships between the images for differentiating between plant detriments; and applying at least one machine learning process to the training dataset to generate at least one processing model in accordance with the feature analysis. The system may further include at least one spray treatment unit, configured to apply a spray treatment to a selected portion of the plant area based on the determined plant detriment information. The camera may be mounted on a vehicle, and images of the plant area may be captured by the camera as the vehicle is traveling along the plant area. The plant detriment may include one of: a plant pest; and a plant disease.

BRIEF DESCRIPTION OF THE DRAWINGS

The present disclosure will be understood and appreciated more fully from the following detailed description taken in conjunction with the drawings in which.

DETAILED DESCRIPTION OF THE EMBODIMENTS

Figure 1:
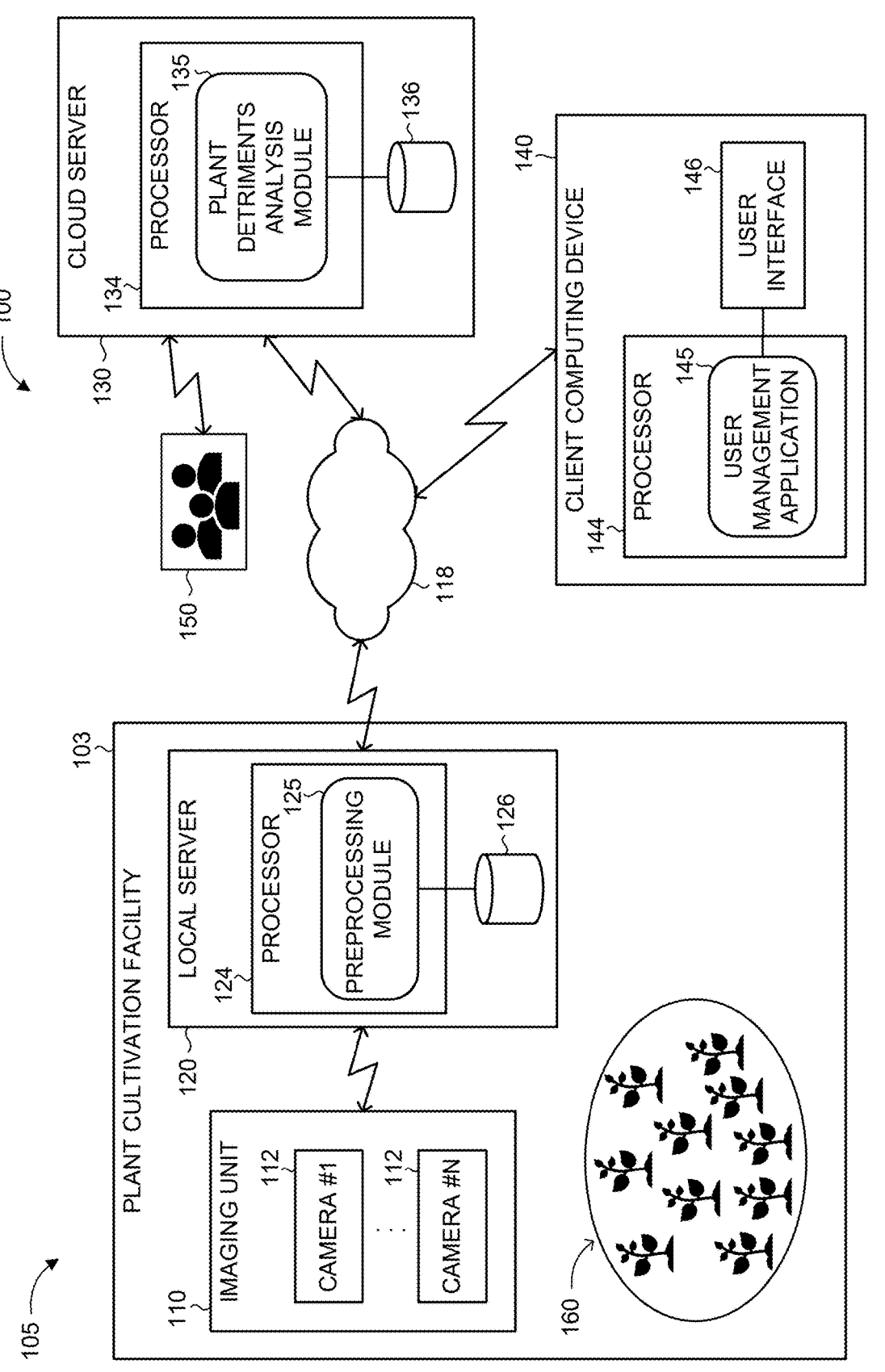
FIG. 1 is a schematic illustration of a network environment supporting a computer-implemented system for detection of plant detriments, constructed and operative in accordance with an embodiment of the present disclosure.

The present disclosure overcomes the disadvantages of the prior art by providing a novel method and system for detection of plant detriments. The disclosed embodiments provide for early detection and identification of plant detriments including pests and diseases, based on targeted image processing using machine learning tools, such as artificial intelligence (AI) classifiers. Rapid alerts may be sent to a plant facility upon a positive detection, including an identification of the detriment and related information such as a precise location on the plant, allowing for implementation of suitable measures to mitigate or treat the detriment and ensure effective plant development. Machine learning analysis may provide reliable and accurate predictive models, which can be iteratively refined to improve subsequent plant detriments detection based on new information and to minimize false positive detections.

Unless otherwise defined, all terms (including technical and scientific terms) used herein have the same meaning as commonly understood by one of ordinary skill in the art to which the disclosed subject matter belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section.

It will be understood that when an element is referred to as being "on", "attached" to, "operatively coupled" to, "operatively linked" to, "operatively engaged" with, "connected" to, "coupled" with, "contacting", "added to", etc., another element, it can be directly on, attached to, connected to, operatively coupled to, operatively engaged with, coupled with, added to, and/or contacting the other element or intervening elements can also be present. In contrast, when an element is referred to as being "directly contacting" another element or "directly added" to another element, there are no intervening elements or steps present.

Whenever the terms "about" or "approximately" is used, it is meant to refer to a measurable value such as an amount, a temporal duration, and the like, and is meant to encompass variations from the specified value, as such variations are appropriate to perform the disclosed methods.

Certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Whenever terms "plurality" and "a plurality" are used it is meant to include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Throughout, this disclosure mentions "disclosed embodiments", "disclosed systems" and "disclosed methods", which refer to examples of inventive ideas, concepts, and/or manifestations described herein. The fact that some disclosed embodiments are described as exhibiting a feature or characteristic does not mean that other disclosed embodiments necessarily share that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The term "plant" is used herein to refer to a eukaryotic multicellular living organism capable of photosynthesis (i.e., excluding humans and animals) and which undergoes growth and development processes (e.g., in soil or water), which may include plant features such as leaves, stems, roots, flowers, and which may (but not necessarily) produce seeds or bear edible fruits. The terms "plant" and "crop" may be used interchangeably herein.

The term "plant facility" as used herein refers to an area of land or property in which plants are grown and cultivated, such as: a farming or gardening plot; a greenhouse or other enclosed structure for regulating plant growth environment, an enclosed building for vertical farming; and may also include bodies of water, such as for aquatic plant growth.

The term "plant detriment" is used herein to broadly refer to one or more organisms or conditions that may impair or detrimentally influence plant development, such as a pest or a disease. Examples of plant detriments may include but are not limited to: biotic stresses, including various plant pathogens, such as: insects, parasites, bacteria, and/or fungi (e.g., aphids, botrytis, downy mildew); as well as abiotic stresses, including water deficiencies or nutrient deficiencies, such as drought; hypersalinity; excessively low or excessively high temperatures; and other environmental stresses. Plant detriments may result in various types of negative changes in plant development, for example: loss of biomass; early flowering; decreased seed amount; diminished crop quality and/or quantity; and the like.

The terms "user" and "operator" are used interchangeably herein to refer to any individual person or group of persons using or operating a method or system of a disclosed embodiment, such as an operator of a plant facility or a staff member engaged with plant cultivation (e.g., a farmer).

The term "repeatedly" as used herein should be broadly construed to include any one or more of: "continuously", "periodic repetition" and "non-periodic repetition", where periodic repetition is characterized by constant length intervals between repetitions and non-periodic repetition is characterized by variable length intervals between repetitions.

Reference is now made to FIG. 1, which is a schematic illustration of a network environment, generally referenced 100, supporting a computer-implemented system, generally referenced 105, for detection of plant detriments, constructed and operative in accordance with an embodiment of the present disclosure. Environment 100 includes at least one cloud server 130, at least one client computing device 140, and may optionally include at least one local server at a plant cultivation facility 103. Local server 120 includes a processor 124 and a database 126. Cloud server 130 includes a processor 134 and a database 136. Client computing device 140 includes a processor 144 and a user interface 146. System 105 includes an imaging unit 110, a preprocessing module 125 operating on local server processor 124, a plant detriments analysis module 135 operating on cloud server processor 134, and a user management application (app) 145 operating on client device processor 144. It is appreciated that the functionality of each of the system modules may operate on one or more of local server 120, cloud server 130, and/or client device 140.

Local server 120 is associated with (e.g., located at) plant cultivation facility 103. Cloud server 130 is associated with a cloud computing service. Client computing device 140 is associated with a user of system 105, such as an operator of plant cultivation facility 103. Client computing device 140 may be embodied by any type of electronic device with computing and network communication capabilities, including but not limited to: a smartphone; a laptop computer; a mobile computer; a netbook computer; a tablet computer; or any combination of the above. Client device 140 may be remotely located from servers 120, 130. Network environment 100 may include a plurality of user computing devices operated by multiple respective users, although a single client device 140 is depicted for exemplary purposes. Similarly, network environment 100 may include a plurality of remote servers, but a single local server 120 and a single cloud server 130 is depicted for exemplary purposes. Local server 120, cloud server 130, and client device 140 are communicatively coupled through at least one network 118. Accordingly, information may be conveyed between local server 120, cloud server 130, and client device 140, as well as to/from other networks communicatively coupled thereto, over any suitable data communication channel or network, using any type of channel or network model and any data transmission protocol (e.g., wired, wireless, radio, WiFi, Bluetooth, and the like). According to an embodiment, local server 120 and cloud server 130 are communicatively coupled through a secure virtual private network (VPN) connection. According to an embodiment, information is transmitted between cloud server 130 and client device 140 using an encrypted communication protocol.

Imaging unit 110 includes at least one camera 112. Camera 112 may be any type of imaging sensor capable of acquiring and providing an image representation of a scene, such as in a plant facility. Accordingly, the term "image" as used herein refers to any form of output from an aforementioned camera, including any optical or digital representation of a scene acquired at any wavelength or spectral region (e.g., visible or infrared), and encompasses both a single image frame and a sequence of image frames (i.e., a "video image"). According to an embodiment, imaging unit 110 includes multiple cameras 112, such as a plurality of visible light (e.g., RGB) cameras. Imaging unit 110 may alternatively include other types of cameras 112, such as an infrared (e.g., IR, NIR, SWIR, LWIR) camera.

Server processor 124 performs data processing required by local server 120 and may receive instructions or information from other components of system 105 or network environment 100. For example, preprocessing module 125 operating on processor 124 may processes image data obtained from imaging unit 110, as will be discussed further hereinbelow. Server database 126 stores relevant information that can be retrieved and processed by server processor 124. Similarly, server processor 134 performs data processing required by cloud server 130 and may receive instructions or information from other components of system 105 or network environment 100. For example, plant detriments analysis module 135 operating on server processor 134 may process image data obtained from imaging unit 110 or from local server 120, as will be discussed further hereinbelow. Server database 136 stores relevant information that can be retrieved and processed by server processor 134. Client device processor 144 performs data processing required by client device 140 and may receive instructions or data from other components of system 105 or network environment 100, such as from cloud server 130. Information may be stored in a local memory (not shown) of client device 140.

User interface 146 allows the user to receive information and to control parameters or settings associated with client device 140. For example, user interface 146 may include a display screen configured to present visual content, such as alerts issued by app 145 based on plant detriments detected by system 100. User interface 146 may include a cursor and/or a touch-screen menu interface, such as a graphical user interface, configured to enable manually entering instructions or data. User interface 146 may also include peripheral communication devices configured to provide audible communication, such as a microphone and an audio speaker, as well as voice recognition capabilities to enable the user to enter instructions or data by means of speech commands. It is noted that user management application 145 may be implemented by a computer program or software application configured to operate in a web browser accessible via user interface 146 (i.e., a web application or "web app"). User management application 145 may also be implemented as a computer program or software application configured to operate directly on client computing device 140 (e.g., a mobile application configured to operate directly on a mobile device such as a smartphone).

The components and devices of system 105 may be based in hardware, software, or combinations thereof. It is appreciated that the functionality associated with each of the devices or components of network environment 100 or system 105 may be distributed among multiple devices or components, which may reside at a single location or at multiple locations. For example, functionality associated with any of processors 124, 134, 144 may be integrated or may be distributed between multiple processing units. System 105 may optionally include and/or be associated with additional components or modules not shown in FIG. 1, for enabling the implementation of the disclosed subject matter.

Figure 2:
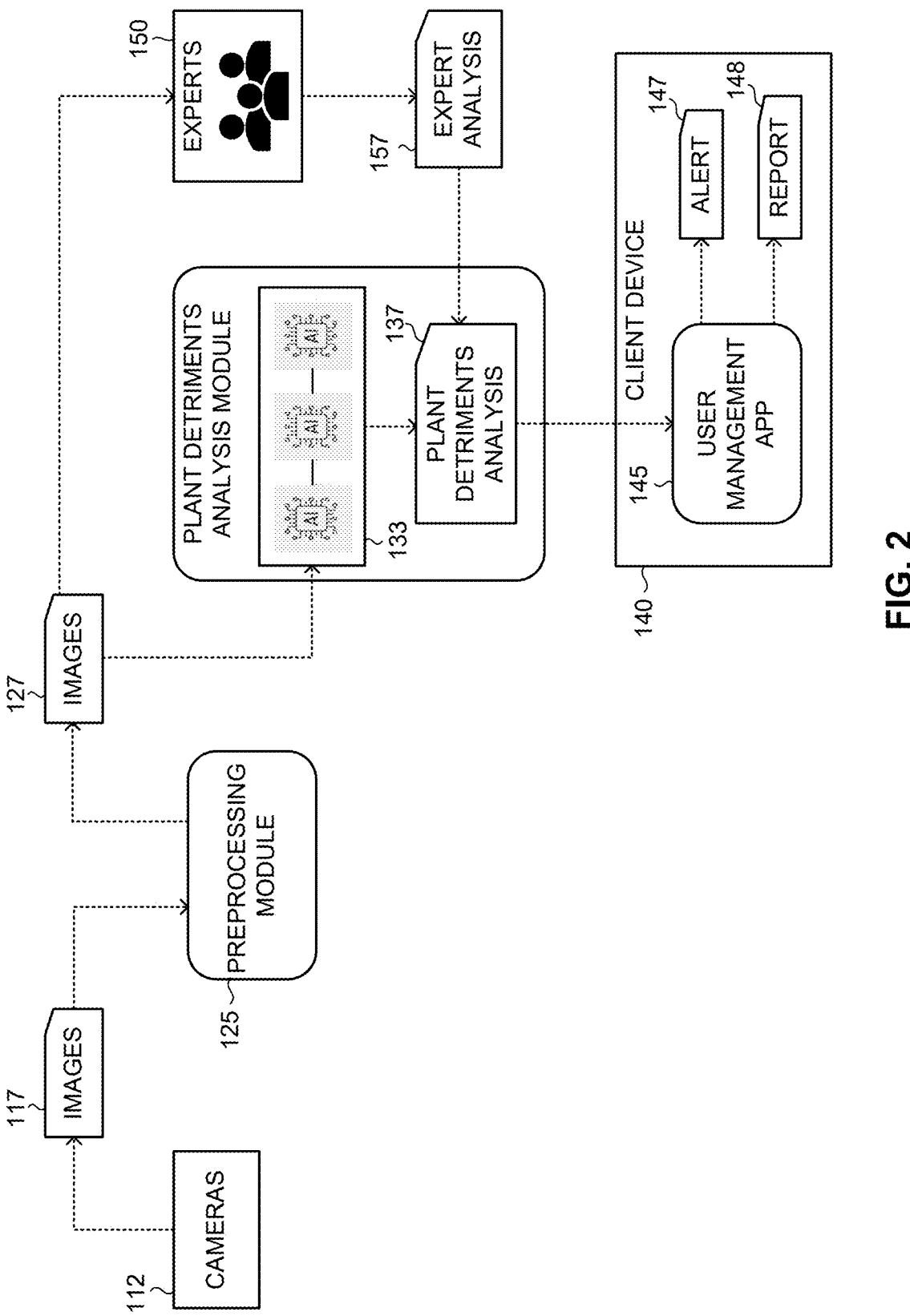
FIG. 2 is a schematic illustration of information flow between the system modules of the system of FIG. 1, operative in accordance with an embodiment of the present disclosure.

The operation of system 105 will now be described in general terms, followed by specific examples. Reference is further made to FIG. 2, which is a schematic illustration of information flow between the system modules of system 105 of FIG. 1, operative in accordance with an embodiment of the present disclosure. Imaging unit 110 captures images 117 of a plant area 160 in plant facility 103 containing one or more plants. Plant area 160 may be situated indoors, such as in a greenhouse, or outdoors, such as in an agricultural field. Accordingly, cameras 112 are situated in the vicinity of plant area 160, such as mounted on a ceiling or a platform in plant facility 103, and positioned such that the line-of-sight is directed towards plant area 160. At least one of cameras 112 may be mobile, such as mounted on a movable platform or repositioned manually by a user, to facilitate imaging of multiple regions within plant area 160 (e.g., different directions or sides of a given plant), including regions that may not be covered by other cameras 112.

The images may be captured periodically at selected times and intervals, such as twice a day (e.g., once in the morning and once in the afternoon). For example, imaging unit 110 may be configured to capture images several times a day at predetermined instances, such as to obtain images at different lighting conditions (e.g., color temperature, brightness) and/or environmental conditions (e.g., temperature, humidity level), or to avoid projected climates or weather events, such as fog, rain or snow. Images of plant area 160 may also be captured at different imaging parameters, such as at multiple imaging directions or line-of-sights, field of views (FOVs), resolutions, dynamic ranges, focal lengths, and/or magnification or zoom levels. Imaging unit 110 may be configured to apply different imaging parameters based on the properties or conditions of plant area 160. For example, a wide-angle zoom may be applied to image a large angular extent of plant area 160, whereas a narrow-angle zoom may be applied (e.g., using a telephoto zoom lens) to obtain a close-up view of individual plants, such as for detecting selected artefacts.

Imaging unit 110 may include multiple cameras 112, such as at least one pair of cameras 112 configured to produce a stereoscopic image. Imaging unit 110 may also include multiple cameras 112 with different FOVs, allowing for imaging of a wider overall FOV than would be possible with a single camera. More generally, imaging unit 110 may include different types of cameras 112 having different imaging modes or imaging parameters, so as to obtain a diversity of image types. According to an embodiment, at least one of cameras 112 is a standard RGB camera. The captured plant images 117 may include individual static image frames, or a sequence of image frames of a video image.

Plant detriments detection module 135 may obtain information relating to plant area 160 and/or plant facility 103 being monitored. The received information may include, for example: a name or identification details of plant facility 103; a geographic location; an indication of a particular plant area within the facility (e.g., a selected greenhouse or field); size of plant area; type of plants contained in plant area; date and start time of monitoring; and the like. The plant area and plant facility information may be received from local server 120, obtained from a user (e.g., manually input via user interface 146), retrieved automatically from publicly available online sources; and/or received from sensors or registration devices situated in plant cultivation facility 103.

The captured plant images 117 are received and processed at local server 120 and/or cloud server 130. For example, preprocessing module 125 may perform initial processing of captured images 117, such as to divide each image 117 into multiple zones. According to an embodiment, an imaged plant area 160 is divided into a plurality of regions, referred to herein as "plant area regions", and images may be collected individually for each plant area region. The position of each plant area region is obtained for future reference. The plant area region position may be obtained using one or more sensors or instruments configured to measure the position and orientation of camera 112 with respect to a reference coordinate system. For example, camera 112 may include or be coupled with an inertial measurement unit, which may include motion sensors or rotational sensors, configured to detect a viewing direction of camera 112 and/or position and orientation coordinates of a scene imaged by camera 112, from which a position of a corresponding plant area zone may be determined. Alternatively, the plant area region position may be provided manually by an operator. Further alternatively, the plant area region position may be automatically determined based on installation parameters of camera 112, such as height, orientation and other parameters, which may be determined using computer vision based processes known in the art. Preprocessing module 125 may receive an omnidirectional (e.g., 360°) view of camera 112, corresponding to a hemisphere viewable by camera, and automatically divide the obtained images into plant area regions, such as based on the facility dimensions and plant locations, which may be automatically detected using computer vision processes known in the art.

Preprocessing module 125 may perform additional preprocessing of the captured images 117. For example, preprocessing module 125 may modify image properties in order to facilitate comparison of images captured at different times and/or with different imaging parameters, such as to provide unified properties (e.g., resolution, focal lengths, magnification/zoom scale) for multiple images 117, using known processing techniques. Such image modification is optional, and the original images may alternatively be compared directly without pre-processing.

Figure 3:
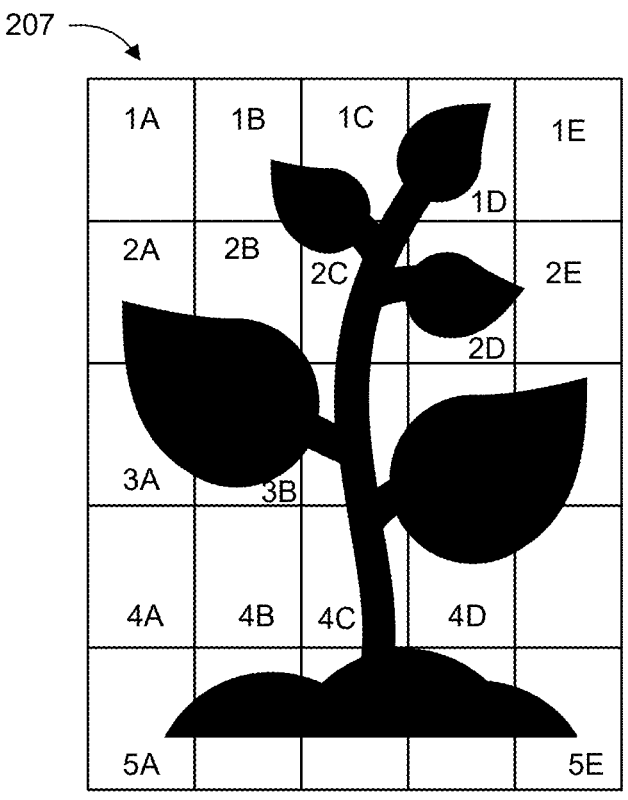
FIG. 3 is an illustration of an exemplary plant image divided into a plurality of image zones, operative in accordance with an embodiment of the present disclosure.

Cloud server 130 may receive images 127 from local server 120 following initial processing, such as via a secure VPN communication channel. Analysis module 135 applies further processing operations to images 127. In particular, each image is divided into multiple regions or zones, referred to herein as "image zones". For example, each image is divided into 25 image zones. Analysis module 135 detects abnormalities in each individual image zone. Specifically, at least one machine learning process, such as a binary classifier, is applied to each respective image zone. A binary classifier is a type of supervised learning or machine learning algorithm configured to classify new observations into one of two categories or classes based on a classification rule. The classifiers 133 may be organized into groups or pipelines, where the results of a first classifier may be used to modify or inform the results of at least one subsequent classifier, such as to improve precision of the overall detection. Each classifier is configured to detect a respective aberration or plant artifact in an image zone. For example, a first classifier 133A may be directed to detect the presence of powdery mildew, a second classifier 133B may be directed to detect the presence of bud rot, and a third classifier 133C may be directed to detect the presence of aphids. Analysis of the image zones may be done sequentially such that information from one or more previous image zones is taken into account to determine the likelihood of an abnormality/aberration. Thus, a first image zone in an image is processed by a sequence (pipeline) of classifiers, each configured to detect a specific aberration within that image zone. Subsequently, a second image zone in the image is processed by the same pipeline of classifiers. This process is repeated until all the image zones are processed by the classifiers. Reference is made to FIG. 3, which is an illustration of an exemplary plant image, referenced 207, divided into a plurality of image zones, operative in accordance with an embodiment of the present disclosure.

It is noted that the detection of a given image zone may utilize classifications obtained by classifiers for previously processed image zones. For example, the processing of image zone$_N$ may utilize information detected in any one of image zone$_1$ through image zone$_{N-1}$. In addition, the processing of any one of image zone$_1$ through image zone$_{N-1}$ may utilize information detected in image zone$_N$, such as during a second stage processing of the image zones. Each image zone may be differentially weighted in terms of the relative influence for the classification of a currently processed image zone. For example, the artifact determination in a processed image zone may utilize information from nearby image zones in a more heavily weighted manner as compared to more distant image zones. Referring to plant image 207 of FIG. 3, a first image zone 1A may assign a first weighting to surrounding zones 1B, 2A, 2B (i.e., in the spatial vicinity of image zone 1A), which is higher than a second weighting assigned to more distant image zones (1C, 2C, 3A, 3B, 3C). A third weighting, which is lower than the second weighting, may be assigned to even more distant image zones from image zone 1A in image 207 (e.g., zone 1D, 2D, 3D, 4A, 4B, 4C, 4D), and so forth. It is noted that other criteria may be used for assigning relative weightings to other image zones, in addition to or instead of spatial distance, for example based on similarity of image content to the current image zone, or based on a confidence level of detected artifacts within the respective image zones.

A classifier may utilize an entire image frame for added context or reference when detecting artifacts in a given image zone. Furthermore, a classifier may utilize other image frames as reference, such as a frame captured at an earlier time (e.g., of the same plant, and/or associated with similar environmental conditions or imaging parameters as the current image frame). The machine learning processes may be reapplied over the entire image for multiple iterations. For example, after each image zone (zone$_1$ through image zone$_N$) undergoes a first pass through the pipeline of classifiers sequentially, the image zones may subsequently undergo at least a second pass through the pipeline classifiers, which may provide enhanced artefacts detection.

In general, the processing of images 127 may utilize any suitable machine learning or supervised learning process or algorithm, including but not limited to: an artificial neural network (ANN) process, such as a convolutional neural network, recurrent neural network (RNN), or a deep learning algorithm; a classification or regression analysis, such as a linear regression model; a logistic regression model, or a support-vector machine (SVM) model; a decision tree learning approach, such as a random forest classifier; and/or any combination thereof. The data analysis may utilize any suitable tool or platform, such as publicly available open-source machine learning or supervised learning tools.

As discussed, the classifiers are organized into groups where the results of a first classifier may be used to modify or inform the results of following classifiers. A combination of classifiers may operate at multiple levels of magnification (zoom) or resolution (granularity). The classifiers may be organized into different hierarchical levels. For example, a micro-level classifier, also referred to herein as a "region classifier", may be configured to process an individual region (zone) within an individual image, which generally covers only a portion of a plant. A standard-level classifier may be configured to process an entire plant image as a whole, which may encompass approximate images of multiple plants. A macro-level classifier may be configured to process groups of plants.

All classifiers may operate using confidence levels, such as between a range of 0 to 1, with regard to the presence of particular plant detriments. The pipeline classifier aggregation may factor a scoring from each classifier into a weighted final detected probability in each processed region.

A classifier may automatically take into consideration past predictions of the same (or similar) plants or plant areas being monitored (i.e., "temporal context") and adjust the detection results based on other images (e.g., captured previously or afterwards) of parts of the same image of the monitored plant.

A classifier may automatically take into consideration predictions of nearby (or proximate) plants or plant areas being monitored (i.e., "proximity context") and adjust the detection results based on other images (e.g., captured previously or afterwards) of plants in proximity to the monitored plant.

It is appreciated that the overall detection results of a plurality of binary classifiers, each configured to detect a particular aberration within a subregion (zone) of an entire image frame, may provide improved results as compared to a single classifier configured to detect multiple types of aberrations or abnormalities.

After completing processing of images 127, analysis module 135 generates a final plant detriments analysis 137 indicating detected plant detriments in plant area 160.

Expert analysis may also be provided to supplement the detection results of classifiers module 135. Accordingly, one or more experts 150 may perform a manual analysis of images 127, and generate supplementary detection results 157 based on the expert analysis. For example, an expert 150 may be a skilled person having experience relating to plant detriment identification. More generally, a user, such as an operator of plant facility 103, may further supplement plant detriment analysis 157 provided by detection module 135, such as by verifying or confirming at least one detected abnormality in at least one captured image of plant area 160 (e.g., by conducting a physical examination of the relevant plant). User management application 145 of client device 140 may receive information relating to plant detriments analysis 137 (optionally supplemented by expert analysis 157). Client device 140 may be communicatively coupled with cloud server 130 via an encrypted and secure communication channel with strong access control, such as a role-based access control (RBAC) security mechanism with selective user privileges and access, which may be as based on usernames and roles withing plant facility 103.

Application 145 may issue a notification or alert 147 relating to at least one detected plant detriment based on plant detriments analysis 137. For example, an alert 147 may be issued if a determined priority level exceeds a predefined threshold level, such as based on a severity or urgency of the plant detriment (e.g., if urgent attention is required to avoid irreversible harm or damage to the plant). The alert 147 may be displayed on user interface 146, such as via a visual indication (e.g., displaying text, markings and/or symbols, changing colors of graphical information) and/or an audible indication (e.g., alarms, beeps, buzzers, bells, ringtones). Instructions for issuing an alert 147 may be sent from server 130 to a plurality of applications 145 operating on respective client devices 140 of multiple users, and/or to at least another destination, such as to a service center or monitoring station associated with plant facility 103. It is noted that alert 147 may be implemented on client device 140 even in the absence of a dedicated user management app 145. For example, an alert 147 may be transmitted from server 130 to client device 140 (e.g., by analysis module 135) in the form of a text message or other visual/audible notification presented via user interface 146, such as through a text messaging service or instant messaging platform. More generally, any information presentable by application 145 may be presented at client device 140 in the absence of a dedicated application.

Application 145 may issue a plant detriments report 148 with information relating to plant detriments analysis 137, which may be presented visually on user interface 146. For example, report 148 may include an illustrated representation of one or more detected plant detriments on a panoramic view of a plant field. Report 148 may include characteristics associated with detected plant detriments, such as a priority level (e.g., based on a severity and/or urgency of the detriment), or a confidence level (i.e., reflecting a reliability and/or accuracy of the detected detriment). Different plant detriments may be classified into different groups or subgroups, such as based on the general type of detriment (e.g., pest or disease), and further divided into relevant categories (e.g., based on plant variety, pest or disease classifications; or based on relevant treatment categories). Report 148 may further include various statistics associated with the detected plant detriments, such as historical data relating to plant detriment information obtained for the same plant facility 103 and/or plant area 160 at previous dates and times, or plant detriment data obtained for similar plant facilities or plant areas containing similar plant types in other facilities. The information and statistics may be presented over a selected duration, such as depicting changes in detected plant detriments over days, weeks, months, years, or other time periods, such as calendar seasons or agricultural seasons. Based on the presented plant detriments report 148, a user can decide how to treat or mitigate one or more detected plant detriments for improving plant cultivation in the monitored plant area 160. Application 145 may also provide recommendations or suggested actions for treatment of at least one detected plant detriment, in accordance with plant detriments analysis 137. Such recommendations may be based on user feedback. For example, a user may specify certain constraints or limitations for treatment of plants in plant area 160 or specify particular plants or plant types in plant area 160 having a higher importance or priority level for treatment, and application 145 may determine and present recommendations geared for optimizing the user criteria.

According to an aspect of the present disclosure, application 145 may display a panoramic view of plant area 160 augmented with visual indications relating to detected plant detriments overlaid conformally onto the view of the physical environment at the corresponding plant locations. For example, application 145 may display an omnidirectional (e.g., 360°) panoramic view image of plant area 160 and at least one augmented reality (AR) image overlaid conformally onto the panoramic view image. The displayed augmented reality image may include supplementary content such as graphics, text or symbols relating to a respective plant detriment, superimposed onto the background panoramic view of area 160 at a precise location of the respective plant to which the plant detriment pertains. The displayed supplementary content may include a text or graphic specifying a type of detriment, as well as information relating to an urgency or severity of the detriment, such as via a color-coding scheme. Accordingly, the displayed panoramic view may be visually augmented with an AR layer indicating precise locations of all plant detriments detected in plant area 160, along with associated plant detriment characteristics and possible treatment actions.

A further monitoring session may be conducted following an initial group of mitigation treatments applied to plant area 160 in accordance with an initial detection of plant detriments by system 105. For example, after implementing mitigation treatments based on a first plant detriments analysis 137 received at a first time and date, a second session may be performed at a second time and date (e.g., following one or more hours, days, weeks, and/or months). The second plant detriment analysis 137 can be used to monitor the state of the previously detected plant detriments, and the progress or success rate of implemented mitigation treatments, and to suggest further or alternative treatment if necessary. The information may also be used to improve subsequent treatment, such as of similar plant detriments of similar plants or plant areas, determined by system 105 for other plant monitoring facilities. Further parameters and calculated statistics obtained over subsequent sessions can provide a more comprehensive evaluation to allow for targeted recommendations for plant cultivation at plant facility 103.

According to an embodiment, the disclosed system and method may provide plant detriment forecasting based on previously detected plant detriments. The system may identify individual plants in a collection of captured images 117 and detect plant detriment artefacts for an identified plant. Afterwards, the system may check the same plant detriment artefacts on the same plant over subsequent periods and report on the development of selected detriments, such as progression of a plant disease. For example, based on the development of a particular plant detriment, the system may predict if or when major changes to a plant may occur (e.g., the plant will be beyond treatment and will wilt or die). The system may also recommend if or when a treatment is required for a plant based on the developing detriment. The system may further recommend a treatment application area (e.g., position on plant, size of area) to address the developing detriment. The system may recommend a treatment method (e.g., application of a chemical, plant cutting) to address the developing plant detriment.

Figure 4:
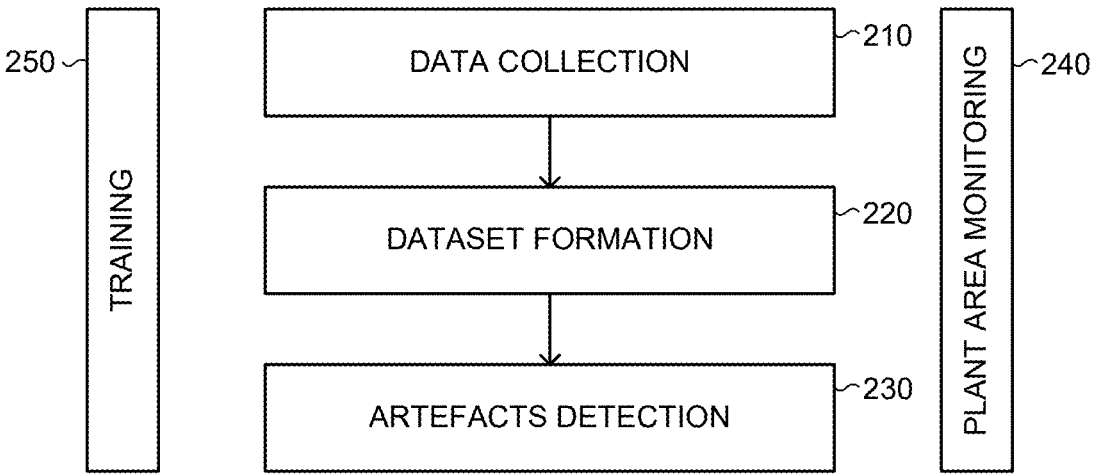
FIG. 4 is an illustration of general operational processes of a method for detection of plant detriments, operative in accordance with an embodiment of the present disclosure.

Reference is made to FIG. 4, which is an illustration of general operational processes of a method for detection of plant detriments, operative in accordance with an embodiment of the present disclosure. The method can be generally divided into a data collection phase 210, a dataset formation phase 220, and a (computer vision-based) plant artefacts detection phase 230. The method can further be divided into a plant area monitoring process 240 and a training process 250, each of which includes a data collection phase 210, a dataset formation phase 220, and a plant artefacts detection phase 230. In plant area monitoring process 240, plant detriments are detected using machine learning models previously trained using learning samples provided during a preliminary training process 250, as will be discussed further hereinbelow.

Figure 5:
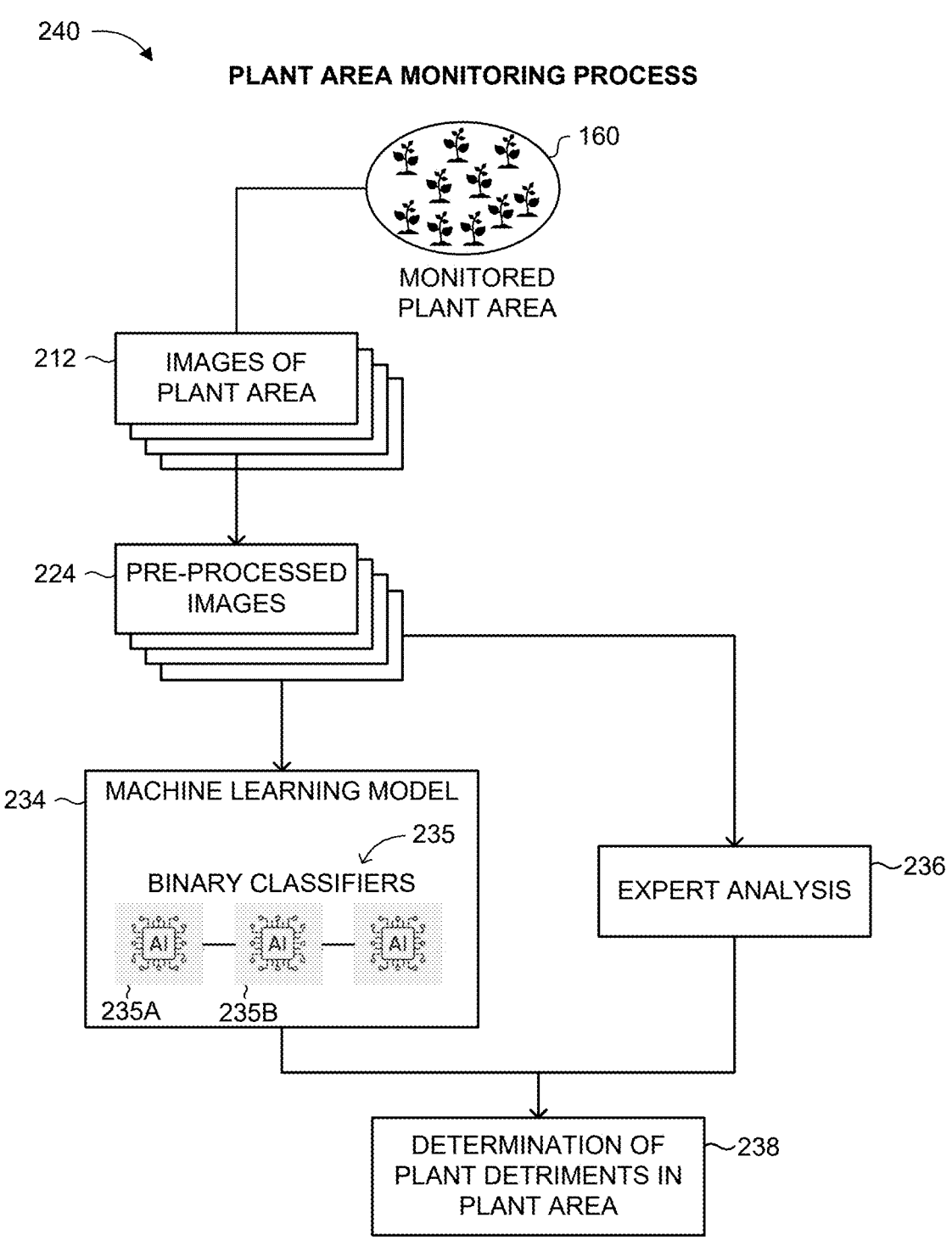
FIG. 5 is a flow diagram of a plant area monitoring process of a plant detriments detection method, operative in accordance with an embodiment of the present disclosure.

Reference is made to FIG. 5, which is a flow diagram of a plant area monitoring process of a plant detriments detection method, operative in accordance with an embodiment of the present disclosure. A plurality of images 212 of a monitored plant area 160 is obtained using cameras 112 of imaging unit 110. The captured images 212 may optionally undergo initial processing by preprocessing module 125 to produce pre-processed images 224. Pre-processed images 224 undergo further processing by plant detriment analysis module 135. Each image is divided into a plurality of image zones and fed into a machine learning model 234 containing a pipeline of binary classifiers 235. The image zones are sequentially processed by each of binary classifiers 235 (and/or other machine learning processes) to produce a machine learning based plant detriments analysis. The images 224 may optionally be further analyzed by one or more experts to produce a supplemental expert analysis 236. A determination 238 of plant detriments in plant area 160 is established based on the analysis produced by machine learning model 234 together with the (optional) expert analysis 236.

Figure 6:
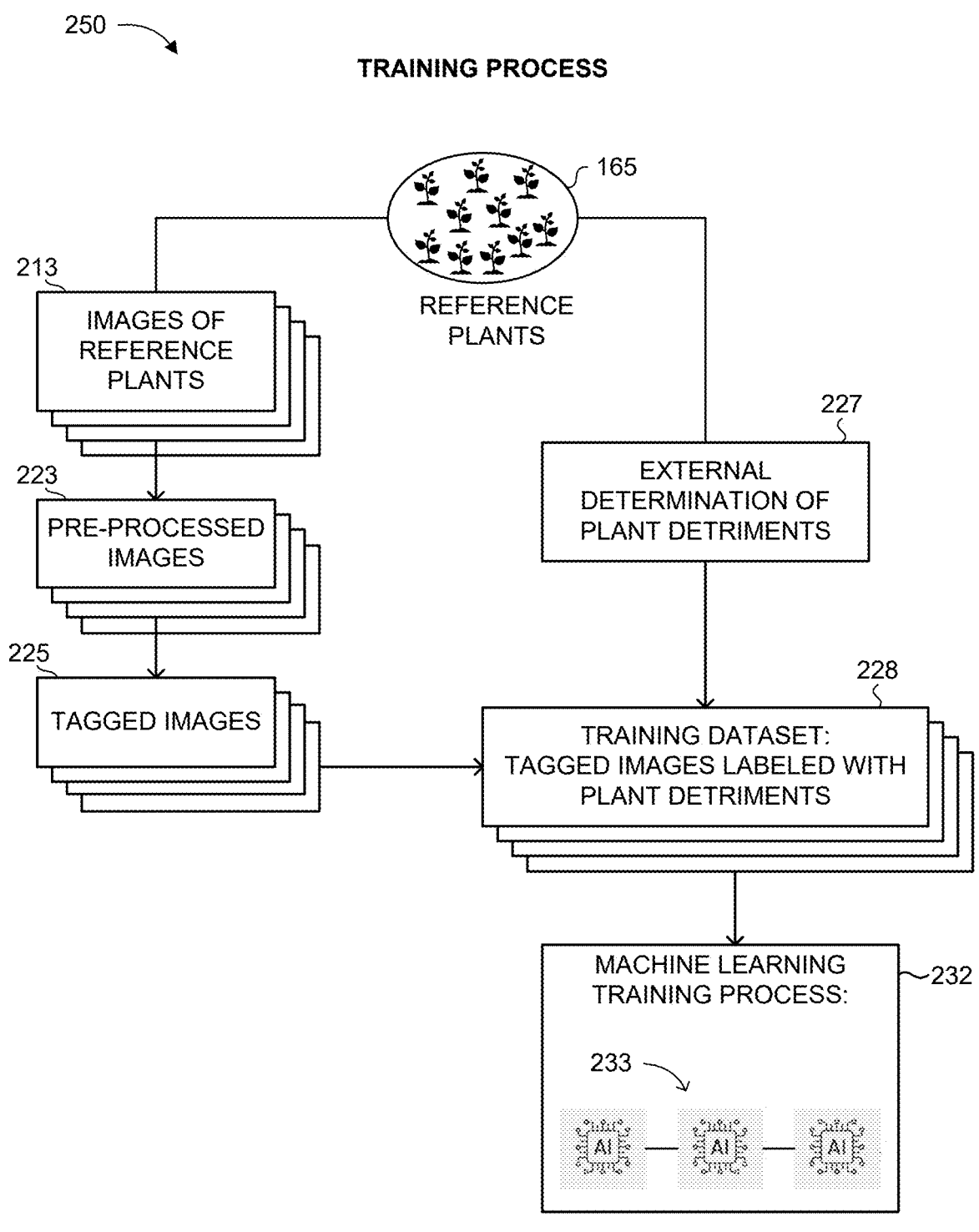
FIG. 6 is a flow diagram of a model training process of a plant detriments detection method, operative in accordance with an embodiment of the present disclosure.

Reference is made to FIG. 6, which is a flow diagram of a model training process of a plant detriments detection method, operative in accordance with an embodiment of the present disclosure. A plurality of reference images 213 of reference plants 165 is obtained, such as using cameras 112 of imaging unit 110. The captured reference images 213 may optionally undergo initial processing to produce pre-processed images 223 and undergo image annotation or tagging to produce tagged images 225. Since different plant facilities (e.g., farms or greenhouses) may have different growing conditions, the captured reference plant images 213 may undergo normalization to create a robust dataset that can provide effective results across a wide range of growing conditions.

An external plant detriments determination 227 of reference plants 165 is obtained, such as using a manual (e.g., expert) analysis of images 225 and/or physical measurements and examination of reference plants 165 on site. Each tagged image 225 is assigned a label based on the external plant detriments determination 227, such that each image 225 includes a label of plant detriments for the reference plants that appear in that image. This is repeated for a substantially large collection of images and reference plants to generate a training dataset 228 made up of tagged images labeled with respective plant detriments.

The formation of training dataset 228 may be implemented at multiple levels of magnification (zoom) or resolution (granularity). For example, tagged images 225 may be selected such that training dataset 228 includes a sufficient number of images captured at different magnification levels or zoom settings (e.g., spanning wide-angle and narrow-angle views), imaging a particular reference plant at a wide range of different scales and sizes. When forming training dataset 228, multiple reference images 225 having a shared characteristic, such as images of the same plant, may be classified into a common training category. Furthermore, visual clusters of closely related plant detriments (e.g., related plant diseases) and visually similar local manifestations of an object of interest may be considered when generated training dataset 228 for enhancing processing capabilities.

Training dataset 228, representing tagged reference plant images 225 and associated plant detriment labels 227 for a large number of reference plants, undergoes processing using at least one machine learning training process 232, to implicitly identify different patterns and create models for plant detriment detection. Specifically, training dataset 228 is fed into a training process 232 at cloud server 130 that utilizes machine learning techniques to generate a machine learning based plant detriments detection model 234 that can be applied on new datasets during a plant monitoring stage (i.e., images 211 of a monitored plant area 160). The training process 232 may apply machine learning techniques to produce mapping functions that can be used for classifying additional instances of new datasets (plant images) according to relevant classification criteria. For example, training process 232 may include a pipeline of artificial intelligence classifiers 233. In general, training process 232 may utilize any suitable machine learning or supervised learning process or algorithm, including but not limited to: an artificial neural network (ANN) process, such as a convolutional neural network, recurrent neural network (RNN), or a deep learning algorithm; a classification or regression analysis, such as a linear regression model; a logistic regression model, or a support-vector machine (SVM) model; a decision tree learning approach, such as a random forest classifier; and/or any combination thereof. The data analysis may utilize any suitable tool or platform, such as publicly available open-source machine learning or supervised learning tools.

The generated plant detriments detection model 234 may be dynamically updated over time, such as based on repeating training processes 250 performed using updated training datasets 228. Training dataset 228 may be based on reference plant images 213 obtained from different sources (e.g., different types of plants and multiple plant facilities) and employing various imaging modalities and various examination techniques for obtaining the reference plant detriment determination 227, which may provide further variation to augment the training process. Images obtained from a particular plant cultivation facility 103 and labeled with plant detriments of reference plants in that facility 103 may be provided to enrich a training dataset for generating a facility specific detection model 234, which may be applied during a subsequent plant monitoring stage at that facility 103. Such images may allow for an indefinite and continuous dataset building process for a given facility 103.

Figure 7:
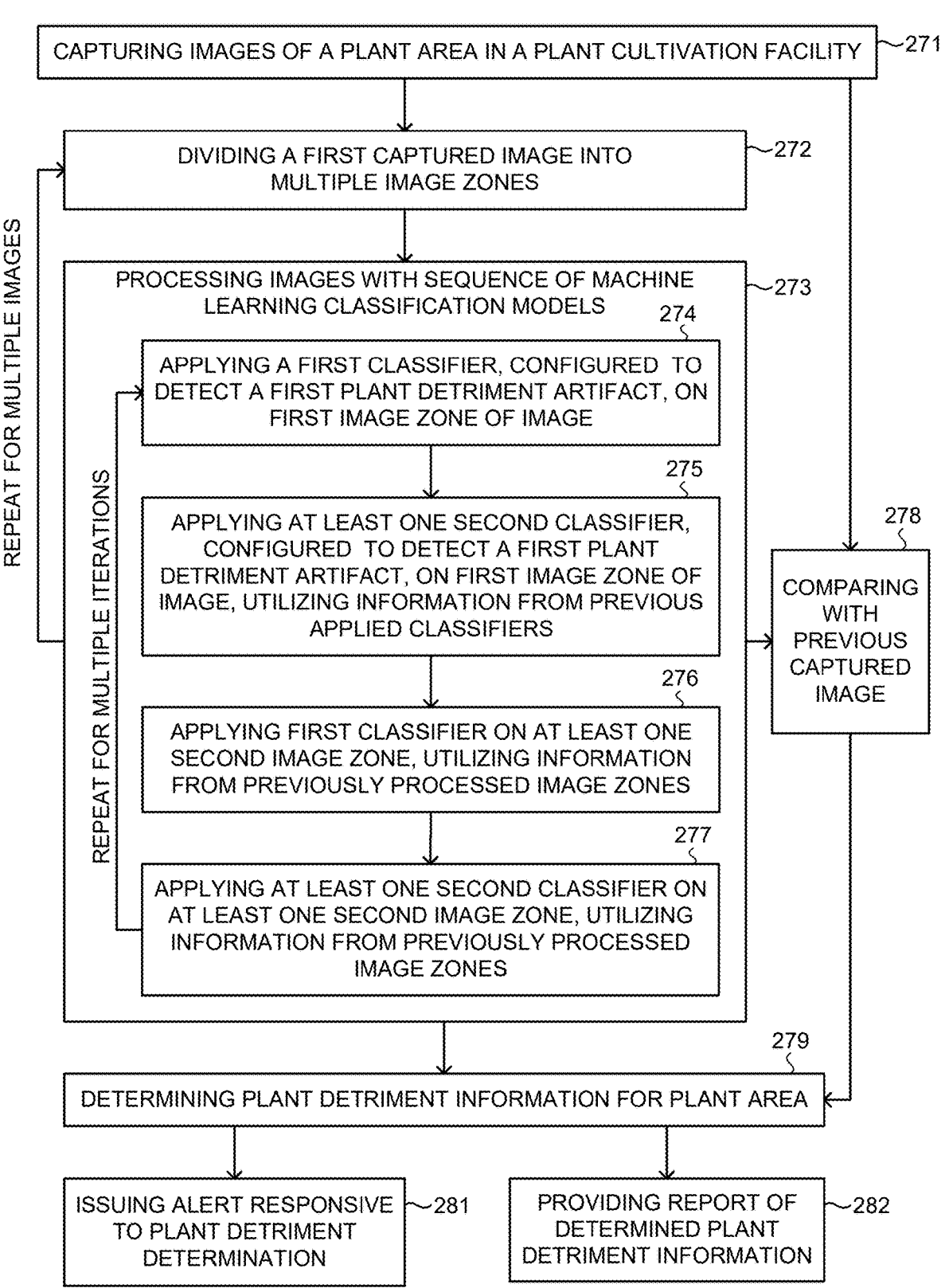
FIG. 7 is a flow diagram of a computer-implemented method for detection of plant detriments, operative in accordance with an embodiment of the present disclosure.

Reference is made to FIG. 7, which is a flow diagram of a computer-implemented method for detection of plant detriments, operative in accordance with an embodiment of the present disclosure. In a step 271, images of a plant area in a plant cultivation facility are captured. Referring to FIGS. 1 and 2, imaging unit 110 captures images 117 of a plant area 160 of a plant cultivation facility 103 containing at least one plant. Plant area 160 may be divided into multiple regions, and images 117 may be captured for one or more plant area regions. The captured plant images 117 may be obtained using multiple cameras 112 having different imaging modalities. Plant images 117 may be obtained intermittently at periodic intervals and at varying lighting conditions or environmental conditions.

In a step 272, a first captured image is divided into multiple image zones. Referring to FIGS. 2 and 3, plant detriments analysis module 135 processes the captured images 117 by dividing each image into multiple regions or image zones, such as 25 zones per image (e.g., a 5×5 grid), as shown in exemplary plant image 207. Images 117 may optionally undergo additional preprocessing, such as normalization of images having different properties.

In a step 273, the images are processed by applying a sequence of machine learning classification models. Referring to FIG. 2, plant detriments analysis module 135 applies machine learning processing of images 127. Step 273 includes sub-procedures 274, 275, 276, 277. In a sub-procedure 274, a first binary classifier configured to detect a first plant detriment artifact is applied on a first image zone of the image. Referring to FIGS. 1, 3 and 5, a first classifier 235A of a machine learning model 234 of plants detriments detection module 135 is applied to a first image zone of a first image, such as image zone 1A of exemplary plant image 207, where the first classifier 235A is configured to detect a first type of aberration or artifact associated with a plant detriment in the first image zone.

In a sub-procedure 275, at least one second binary classifier configured to detect a second plant detriment artifact is applied on the first image zone of the image. Referring to FIGS. 1, 3 and 5, a second classifier 235B of machine learning model 234 is applied to a first image zone of a first image, such as image zone 1A of exemplary plant image 207, where the second classifier 235B is configured to detect a second type of aberration or artifact associated with a plant detriment (i.e., different from the first type of aberration detectable by first classifier 235A). For example, first classifier 235A may be directed to detect the presence of powdery mildew, and second classifier 235B may be directed to detect the presence of bud rot. Sub-procedure 275 may be repeated iteratively for each of the additional classifiers 235 of machine learning model 234, where each additional classifier 235 is applied sequentially onto the first image region 1A of the processed image 207.

In a sub-procedure 276, the first binary classifier configured to detect a first plant detriment artifact is applied on a second image zone of the image. Referring to FIGS. 1, 3 and 5, a first classifier 235A of machine learning model 234 is applied to a second image zone of the first image, such as image zone 1B of exemplary plant image 207, where the first classifier 235A is configured to detect a first type of aberration or artifact associated with a plant detriment in the second image zone 1B.

In a sub-procedure 277, at least one second binary classifier configured to detect a second plant detriment artifact is applied on a second image region of the image. Referring to FIGS. 1, 3 and 5, a second classifier 235B of machine learning model 234 is applied to the second image zone of a first image, such as image zone 1B of exemplary plant image 207, where the second classifier 235B is configured to detect a second type of plant detriment aberration or artifact (i.e., different from the first aberration detectable by first classifier 235A). The detection of the second classifier 235B may take into account data of previously processed image zones in image, such as image zone 1A. Sub-procedure 277 may be repeated iteratively for each of the additional classifiers 235 of machine learning model 234, where each additional classifier 235 is applied sequentially onto the second image region 1B of processed image 207. For example, each of classifiers "1" through "N" are applied to an image zone "M" of a processed plant image 207, where the processing may take into account plant detriment processing of image zones "1" through "M−1". The utilized information from previous zones may be differentially weighted, such as based on the image zone properties relative to the currently processed zone, such as based on the spatial proximity to the current image zone, and/or based on a confidence level of previous processing. After each of the image zones (1A . . . 5E) of an image 207 have been sequentially processed by each of the classifiers 235, the image zones may then be reprocessed sequentially over at least another iteration (i.e., iteratively repeating sub-procedures 274, 275, 276, 277), where the processing of an image zone in a second iteration may utilize information obtained during the first iteration processing. For example, a second iteration processing of image zone "1" through image zone "M−1" may take into account a first iteration processing of image zone "M" (and/or of additional image zones).

In an optional step 278, results of at least one processing step is compared with at least one previous captured image for additional context. Referring to FIGS. 1, 3 and 5, for each processing of a respective image zone by a respective classifier 235 of machine learning model 234, the analysis of the image zone may utilize information of other images (i.e., different from the currently processed image), such as a previously captured image. For example, the processing of an image zone "M" in image 207 may utilize information from the processing of the same or similar image zone "M" in other images, such as other images of the same or similar plant, and/or captured under similar conditions as image 207.

The processing of image zones is described for exemplary purposes using artificial intelligence classifiers but may alternatively be implemented with additional or alternative machine learning processes using a machine learning model 234 previously trained using training datasets (as described in FIG. 6).

In a step 279, plant detriment information for the monitored plant area is determined. Referring to FIGS. 2 and 5, plant detriments detection module 135 generates a plant detriment analysis 137 based on the classifier-based processing of images 127. Plant detriments analysis 137 may optionally be supplemented by expert analysis 157 obtained based on a manual analysis of images 127 performed by one or more experts 150 (and/or based on a physical examination of plant area 160). Plant detriments analysis 137 may include a classification of determined plant detriments according to priorities based on predefined criteria, such as based on a severity or urgency of the plant detriment. For example, detected plant detriments may be classified according to a degree to which the detriment requires urgent attention, such as to avoid irreversible harm or damage to the plant.

In a step 281, an alert is issued responsive to the plant detriment determination. Referring to FIGS. 1 and 2, application 145 may issue an alert 147 on client device 140 responsive to plant detriments analysis 131, when predetermined criteria is met. For example, an alert 147 may be issued if a priority of a determined plant detriment in monitored plant area 160 exceeds a threshold level, such as if urgent attention is required to avoid irreversible harm to a plant. Alert 147 may be sent from server 130 to a plurality of applications 145 operating on respective client devices 140 of multiple users, and/or to other destinations such as a central monitoring center for plant facility 103.

In a step 282, a report of determined plant detriment information is provided. Referring to FIGS. 1 and 2, application 145 may provide a plant detriments report 148 providing information and characteristics of detected plant detriments. For example, user interface 146 may present notifications relating to the severity or urgency of different plant detriments, such as by assigning a numerical value or color coding to represent the degree of severity or urgency of the detriment. The displayed report may also include information relating to the confidence level (reliability) of each detected plant detriment. The plant detriments may be categorized into different groups or subgroups, such as based on the type of plant or the type of pest or disease, or a type of required treatment or mitigating action that is required or recommended. The displayed report may further include statistics and historical data, such as detected plant detriments of plant area 160 over a selected time period, as well as detected plant detriments of similar plant areas containing similar plants in other plant cultivation facilities. The information may be used for additional training of machine learning model 234 to dynamically improve the detection capabilities. Application 145 may also display a panoramic view of plant area 160 augmented with an AR layer including supplementary visual content (e.g., graphics, text, symbols) relating to one or more plant detriments, overlaid conformally onto the panoramic view at the precise location of the respective plant to which the plant detriment pertains. In general, any information that may be provided by application 145, such as alert 147, report 148, a displayed panoramic image of plant area with AR layer, and the like, may be presented by user interface 146 of at client device 140 in the absence of a dedicated application (such as a web-based app or mobile app).

Monitored plant area 160 may undergo additional monitoring in subsequent sessions, such as over a period of several days, weeks, or months, from which further plant detriments may be detected. Statistical information relating to plant detriments over an extended period may be determined and analyzed to provide focused recommendations for mitigating further plant detriments and for optimizing the plant cultivation in plant area 160. Similarly, additional plant areas in plant cultivation facility 103 may be monitored over an extended period and relevant plant detriment statistics obtained and analyzed for enhancing the operation of the entire plant cultivation facility 103.

The method of FIG. 7 is generally implemented in an iterative manner, such that at least some of the steps are performed repeatedly, to provide for a dynamic determination of plant detriments and associated categorizations and statistics of one or more plant areas and/or plant facilities over time.

Figure 8A:
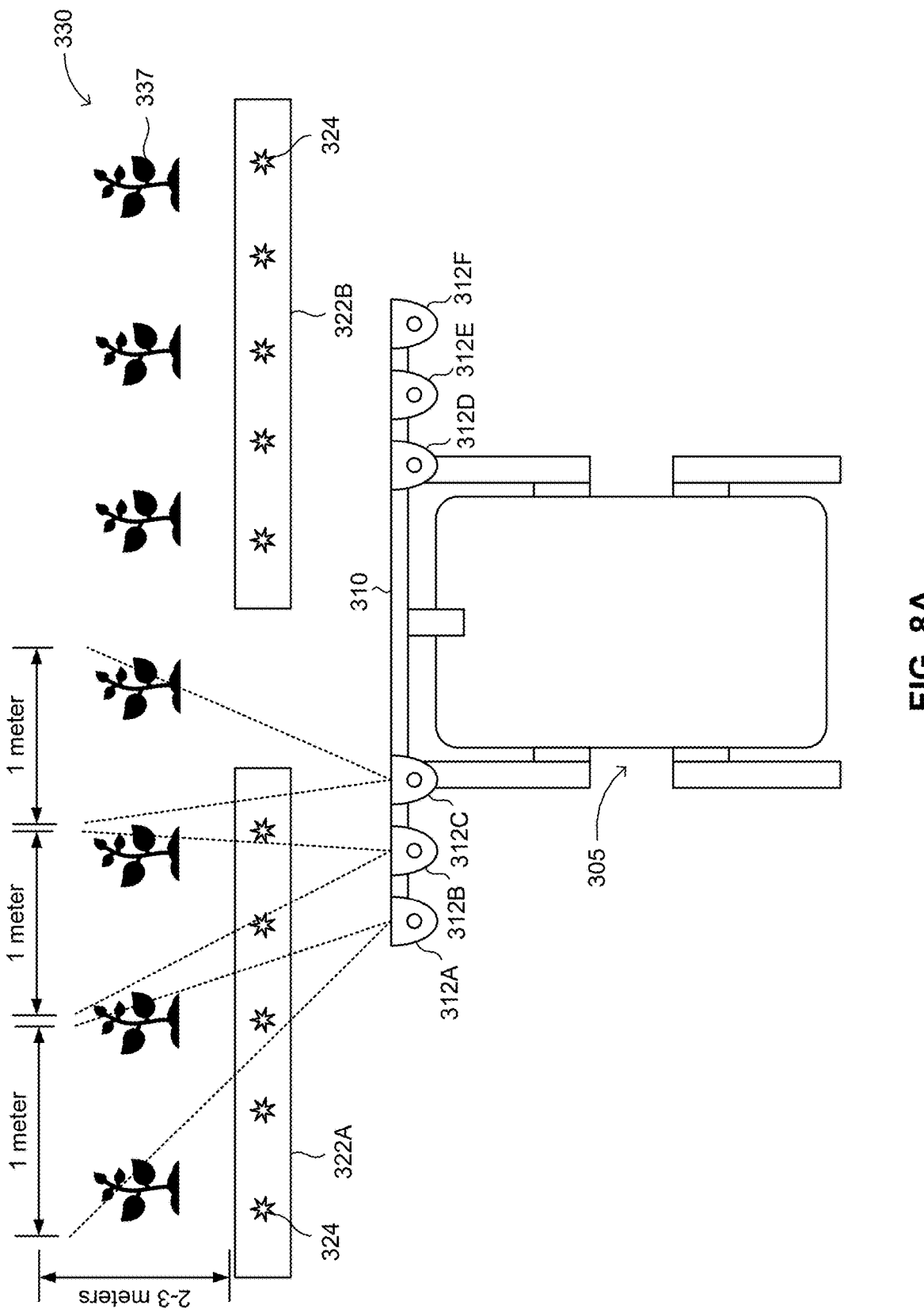
FIG. 8A is a top view illustration of an exemplary vehicle with mounted cameras and configured to control a spraying treatment of a plant area based on detected plant detriments, operative in accordance with an embodiment of the present disclosure.
Figure 8B:
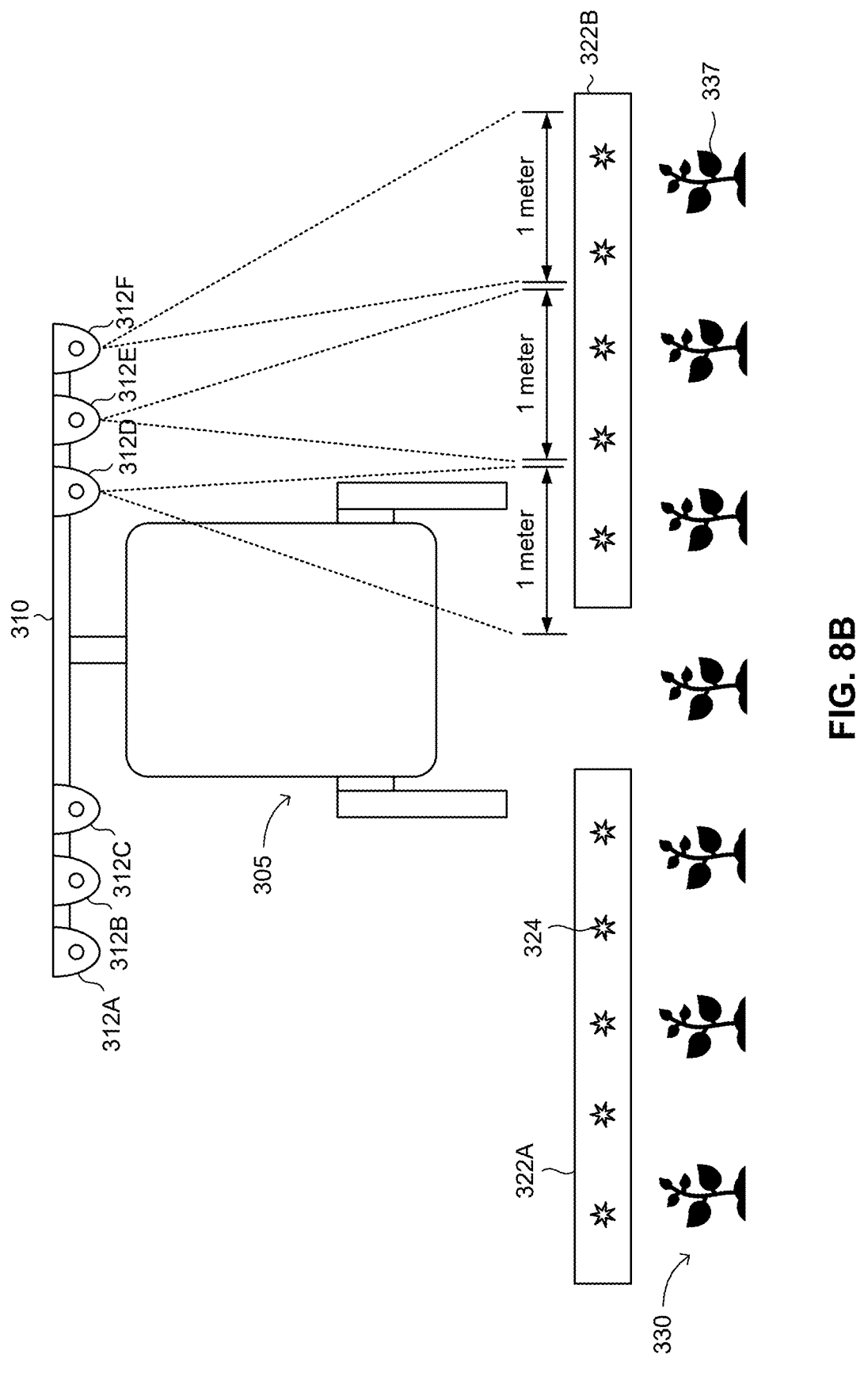
FIG. 8B is a front view illustration of the exemplary vehicle of FIG. 8A.

According to an aspect of the disclosed embodiments, an imaging unit with a plurality of cameras may be mounted on a vehicle configured to drive through a monitored plant area, such as a plant field, while obtaining plant images for plant detriment detection. The images may be processed according to the disclosed plant detriments detection method, and the plant field may undergo selective treatment according to the results. Reference is made to FIGS. 8A and 8B. FIG. 8A is a top view illustration of an exemplary vehicle, generally referenced 305, with mounted cameras and configured to control a spraying treatment of a plant area based on detected plant detriments, operative in accordance with an embodiment of the present disclosure. FIG. 8B is a front view illustration of the exemplary vehicle 305 of FIG. 8A. Vehicle 305 includes a camera mount 310 which holds a plurality of cameras 312A, 312B, 312C, 312D, 312E, 312F. For example, a first group of cameras (e.g., cameras 312A, 312B, 312C) are positioned on a first side (e.g., left side) of camera mount 310 and vehicle 305, and a second group of cameras (e.g., cameras 312D, 312E, 312F) are positioned on a second side (e.g., right side) of camera mount 310 and vehicle 305. The cameras 312 are configured to capture images of a plant area 330 including a plurality of plants 337. For example, the first group of cameras 312A, 312B, 312C may image a first side (e.g., left side) of plant area 330, and the second group of cameras 312D, 312E, 312F may image a second side (e.g., right side) of plant area 330. The images may be captured while vehicle 305 is moving through plant area 330, such as traveling along a predetermined route so as to provide an optimal imaging coverage of plants 337 in accordance with the FOV and imaging properties of each camera 312. Each camera 312 may be configured to image a respective angular coverage area of plant field 330. For example, each camera 312 may be configured to span an angular width of approximately 1 meter, at a distance of approximately 2-3 meters from camera 312. The angular span of a camera 312 may be modifiable, such as based on conditions in plant field 330.

The images may undergo processing by a sequence of machine learning classification models to determine plant detriments in plant area 330 in accordance with the disclosed plant detriment detection method. Vehicle 305 may include or be communicatively coupled with elements of plant detriments detection system 105, such as local server 120 and/or cloud server 130. For example, vehicle 305 may receive a determined plant detriments analysis 137 of plant area 130, such as at a local processor (not shown). The local processor may process the received plant detriments analysis and determine a suitable treatment for plant area 130, such as a spraying treatment for plants 337 detected as having a plant detriment. For example, vehicle 305 may be configured to control a plurality of plant spraying units 322A, 322B directed to dispense a spraying treatment, such as one or more pesticides. For example, each spraying unit 322A, 322B may include a plurality of nozzles 324, and each nozzle may be configured to dispense a particular type of pesticide. Based on the detected plant detriments of plant area 330, the vehicle processor may direct a selected plant spraying unit 322 to dispense a selected spray treatment through a selected nozzle for affected plants 337. For example, a first plant 337 determined to have a first plant detriment may be directed to undergo a first pesticide treatment by a first plant spraying unit 322A, and a second plant 337 determined to have a second plant detriment may be directed to undergo a second pesticide treatment by a second plant spraying unit 322B. A spraying unit may be activated to apply a spraying treatment if it meets certain conditions, such as if the spraying unit contains the spray treatment (e.g., pesticide) that needs to be applied to the affected plant 337, or if the spraying unit is in sufficient proximity to apply the spray treatment to the affected plant 337. The vehicle processor may also control parameters relating to an applied spray treatment, such as: duration of application; intensity of application; time of application; and selected portions of affected plant 337 on which the spray treatment is to be applied. It is appreciated that the disclosed aspect may allow for substantially reducing the application of spray treatments, such as by applying spray treatments only to affected plants 337 or only to an affected section of plant area 330 determined to have plant detriments, rather than applying to an entire plant area 330.

The disclosed plant detriment detection method and system may be implemented in a wide variety of plant cultivation facilities (e.g., greenhouses, gardens, fields) of different types (e.g., agricultural, horticultural, aquacultural), and containing a wide variety of plant types. The system requires only an imaging unit (cameras) at the plant facility, and can thus be deployed with minimal installation costs and time. The information may be processed at a remote cloud server and transmitted using secure communication channels, ensuring data security and privacy, with access limited to authorized parties. The disclosed machine learning analysis may provide reliable and accurate predictive models, which can be iteratively refined and dynamically updated to improve subsequent plant detriments detection based on new information.

While certain embodiments of the disclosed subject matter have been described, so as to enable one of skill in the art to practice the disclosed subject matter, the preceding description is intended to be exemplary only. It should not be used to limit the scope of the disclosed subject matter, which should be determined by reference to the following claims.

The invention claimed is:

1. A computer-implemented method for detecting plant detriments, the method comprising:
   receiving images of a plant area captured by at least one camera;
   for each of at least one received image:
      dividing the received image into a plurality of image zones; and
      sequentially processing each image zone by applying a sequence of machine learning plant detriment processing models to the image zone, each model in the sequence configured to detect a respective plant detriment artifact, wherein processing of a current image zone utilizes information from at least one previously processed image zone within the same image; and
   determining plant detriment information in the plant area, based on the processing.

2. The method of claim 1, wherein sequentially processing each image zone comprises:
   applying a first classifier, configured to detect a first plant detriment artifact, on a first image zone of the image;
   applying at least one second classifier, configured to detect a second plant detriment artifact, on the first image zone;
   applying the first classifier on at least one second image zone of the image, utilizing information from at least one previously processed image zone; and
   applying the at least one second classifier on the at least one second image zone, utilizing information from at least one previously processed image zone.

3. The method of claim 2, wherein the information from the at least one previously processed image zone is differentially weighted based on at least one property selected from the group consisting of: spatial proximity to the current image zone; and confidence level of the processing results of the previously processed image zone.

4. The method of claim 2, wherein the applying steps are repeated over a plurality of iterations for the at least one received image.

5. The method of claim 2, further comprising comparing the processing results of the at least one received image with at least one previously captured image.

6. The method of claim 1, wherein the dividing and sequentially processing are repeated for a plurality of the received images.

7. The method of claim 1, further comprising issuing an alert responsive to the plant detriment determination.

8. The method of claim 1, wherein the plant area is divided into a plurality of plant area regions, and a position and orientation of each plant area regions is obtained based on at least one of: measurements from at least one sensor configured to measure position and orientation of the at least one camera; measurements from an inertial measurement unit coupled with the at least one camera; and installation parameters of the at least one camera determined using computer vision based processes.

9. The method of claim 1, further comprising receiving a user verification of a determined plant detriment and updating at least one of the machine learning plant detriments processing models based on the received verification.

10. The method of claim 1, further comprising displaying, on a display, a panoramic image of the plant area with at least one augmented reality image comprising supplementary content relating to a determined plant detriment, the supplementary content overlaid conformally onto the panoramic image at a location of a respective plant associated with the determined plant detriment.

11. The method of claim 1, further comprising applying a spray treatment to a selected portion of the plant area having a determined plant detriment.

12. A system for detecting plant detriments, the system comprising:

at least one camera, configured to capture images of a plant area; and a processor, configured to:

receive the captured images;

for each of at least one received image: divide the received image into a plurality of image zones; and sequentially process each image zone by applying a sequence of machine learning plant detriment processing models to the image zone, each model in the sequence configured to detect a respective plant detriment artifact, wherein processing of a current image zone utilizes information from at least one previously processed image zone within the same image; and determine plant detriment information in the plant area, based on the processing.

13. The system of claim 12, wherein the processor is configured to sequentially process each image zone by:

applying a first classifier, configured to detect a first plant detriment artifact, on a first image zone of the image;

applying at least one second classifier, configured to detect a second plant detriment artifact, on the first image zone;

applying the first classifier on at least one second image zone of the image, utilizing information from at least one previously processed image zone; and applying the at least one second classifier on the at least one second image zone, utilizing information from at least one previously processed image zone.

14. The system of claim 13, wherein the information from the at least one previously processed image zone is differentially weighted based on at least one property selected from the group consisting of: spatial proximity to the current image zone; and confidence level of the processing results of the previously processed image zone.

15. The system of claim 13, wherein the processor is further configured to compare the processing results of the at least one received image with at least one previously captured image.

16. The system of claim 12, wherein the processor is further configured to issue an alert responsive to the plant detriment determination.

17. The system of claim 12, wherein the at least one camera is configured to capture the images periodically over a predetermined time interval.

18. The system of claim 12, further comprising a display, configured to display a panoramic image of the plant area with at least one augmented reality image comprising supplementary content relating to a determined plant detriment, the supplementary content overlaid conformally onto the panoramic image at a location of a respective plant associated with the determined plant detriment.

19. The system of claim 12, wherein the machine learning plant detriment processing models are generated during a training stage, comprising:

forming a training dataset comprising a plurality of reference images of a plant area, each reference image comprising at least one plant characterized with a known plant detriment;

dividing each of the reference images into a plurality of image zones, and processing the reference images to determine image features associated with a respective plant detriment, and relationships between the images for differentiating between plant detriments; and applying at least one machine learning process to the training dataset to generate at least one processing model in accordance with the determined image features.

20. The system of claim 12, wherein the at least one camera is mounted on a vehicle, and wherein images of the plant area are captured by the at least one camera as the vehicle is traveling through the plant area.

* * * * *